(12) United States Patent
Dou et al.

(10) Patent No.: US 12,166,308 B2
(45) Date of Patent: Dec. 10, 2024

(54) MOUNTING BRACKET ASSEMBLY FOR FIXING CHARGING SOCKET AND CHARGING SOCKET ASSEMBLY

(71) Applicants: TYCO ELECTRONICS (SUZHOU) LTD., Jiangsu Province (CN); TYCO ELECTRONICS TECHNOLOGY (SIP) LTD., Jiangsun Province (CN); TYCO ELECTRONICS (SHANGHAI) CO. LTD, Shanghai (CN)

(72) Inventors: Renyi (Ronny) Dou, Suzhou (CN); Jinshun (Jet) Wang, Suzhou (CN); Fangyue (Jason) Zhu, Shanghai (CN); Kaixuan (Evan) Jiang, Shanghai (CN)

(73) Assignees: TYCO ELECTRONICS (SUZHOU) LTD., Jiangsu Province (CN); TYCO ELECTRONICS TECHNOLOGY (SIP) LTD., Jiangsu Province (CN); TYCO ELECTRONICS (SHANGHAI) CO. LTD, Shanghai (CN)

(*) Notice: Subject to any disclaimer, the term of this patent is extended or adjusted under 35 U.S.C. 154(b) by 450 days.

(21) Appl. No.: 17/575,969

(22) Filed: Jan. 14, 2022

(65) Prior Publication Data
US 2022/0231446 A1    Jul. 21, 2022

(30) Foreign Application Priority Data

Jan. 20, 2021 (CN) .......................... 202120161780.3

(51) Int. Cl.
*H01R 13/436* (2006.01)
*B60L 53/16* (2019.01)
(Continued)

(52) U.S. Cl.
CPC .......... *H01R 13/4362* (2013.01); *B60L 53/16* (2019.02); *H01R 13/502* (2013.01); *H01R 13/74* (2013.01)

(58) Field of Classification Search
CPC .. H01R 13/4362; H01R 13/502; H01R 13/74; H01R 13/741; H01R 2201/26;
(Continued)

(56) References Cited

U.S. PATENT DOCUMENTS

| | | | | |
|---|---|---|---|---|
| 5,344,331 A | * | 9/1994 | Hoffman | H01R 13/641 439/138 |
| 2012/0231649 A1 | * | 9/2012 | Sun | H01R 13/639 439/345 |
| 2013/0257074 A1 | * | 10/2013 | Eberle | B60K 1/04 296/1.07 |

* cited by examiner

*Primary Examiner* — Briggitte R. Hammond
(74) *Attorney, Agent, or Firm* — Potomac Law Group, PLLC

(57) ABSTRACT

The present application provides a mounting bracket assembly for fixing a charging socket and a charging socket assembly. The mounting bracket assembly has a mounting frame and a locking member. The mounting frame defines an installation region configured for receiving the charging socket, and provided with a connection structure configured for installing the locking member. The locking member and the connection structure are movably connected between the pre-locking position and the final-locked position. When the locking member and the connection structure are connected to each other at the pre-locking position, the charging socket is receivable within the installation region of the mounting frame. After the charging socket is received in the installation region, the locking member is moved from the pre-locking position to the final-locked position, and the charging socket is detachably fixed in the installation region. The mounting bracket assembly or the charging socket assembly (Continued)

provided by the present application simplifies working procedures and effectively improves working efficiency.

14 Claims, 2 Drawing Sheets

(51) Int. Cl.
  *H01R 13/502* (2006.01)
  *H01R 13/74* (2006.01)
(58) Field of Classification Search
  CPC .. H01R 13/514; H01R 13/629; H01R 13/639;
  H01R 31/06; B60L 53/16
  See application file for complete search history.

MOUNTING BRACKET ASSEMBLY FOR FIXING CHARGING SOCKET AND CHARGING SOCKET ASSEMBLY

TECHNICAL FIELD

The present application relates to vehicle-mounted charging device technology, and more specifically, relates to a mounting bracket assembly for fixing a charging socket and a charging socket assembly.

BACKGROUND OF INVENTION

With increasing pressure on energy and environment on a global scale, the concept of energy saving, and environmental protection has penetrated into various fields. For the automotive industry, compared with traditional fuel and gas engine vehicles, electric vehicles using power batteries as a power source have gradually entered a wide range of practical stages due to their clean and environmentally friendly characteristics. With the gradual increase in the types and number of electric vehicles, in order to enable a on-board charging socket being used in cars of different models, in existing technologies, the charging socket is fixed on an adapter bracket, and then the adapter bracket with the charging socket is stalled on an electric car, thus the charging socket can be firmly installed on the electric vehicle by selecting a suitable adapter bracket; however, the charging socket and the adapter bracket are fixed by a bolt connection in the existing technology. It is necessary for an operator to disassemble and assemble multiple bolts on the adapter bracket when removing or installing the charging socket, which is cumbersome and leads to low work efficiency.

SUMMARY OF INVENTION

An object of the present application is to provide a mounting bracket assembly for fixing a charging socket and a charging socket assembly, so as to solve technical problems of cumbersome procedures for assembling or disassembling the charging socket from the adapter bracket and low work efficiency in the existing technology.

In order to achieve the above object, a technical solution adopted by the present application is to provide a mounting bracket assembly for fixing a charging socket, which includes a mounting frame and a locking member. The mounting frame defines an installation region for receiving the charging socket, and the mounting frame is provided with a connection structure for installing the locking member. The locking member and the connection structure are movably connected to each other between a pre-locking position and a final-locked position. When the locking member and the connection structure are connected to each other at the pre-locking position, the charging socket is receivable within the installation region of the mounting frame. After the charging socket is received in the installation region, the locking member can be moved from the pre-locking position to the final-locked position, and the charging socket is detachably fixed in the installation region.

In one embodiment, the connection structure includes a limit guide groove and a limiting portion provided above the limit guide groove. The limit guide groove is defined in a surface of the mounting frame and configured to limit a moving direction of the locking member. An installation space is formed by the limit guide groove and the limiting portion for the locking member to be accommodated.

In one embodiment, the locking member includes a plug-in body, and each of two opposite side walls of the plug-in body is convex to form a pre-locking boss and a final-locked boss. The pre-locking boss is configured to restrict a movement of the locking member relative to the mounting frame at the pre-locking position, and the final-locked boss is configured to restrict the movement of the locking member relative to the mounting frame at the final-locked position. The final-locked boss and the pre-locking boss are arranged at an interval.

In an embodiment, each of two opposite side walls of the limit guide groove is provided with a fitting protrusion arranged between the final-locked boss and the pre-locking boss, where the fitting protrusion is configured to limit a displacement of the locking member.

In one embodiment, a bottom surface of the limit guide groove is concavely formed with a guide slot for restricting a moving direction of the locking member, and a bottom surface of the plug-in body is convexly formed with a guide rail suitable for the guide slot.

In one embodiment, the locking member further includes a pressing portion, a side wall of the pressing portion extends to form a limiting protrusion, and a side wall surface of the limiting portion is concavely formed with a limiting groove configured for receiving the limiting protrusion.

In one embodiment, a top surface of the pressing portion is provided with a driver structure, and the driver structure is a driving groove recessed on the top surface of the pressing portion.

In one embodiment, a surface of the pressing portion is provided with a skid-proof structure, and the skid-proof structure is a skid-proof protrusion protruding from the surface of the pressing portion.

In one embodiment, the mounting frame is also provided with a buckle arranged on a side wall of the installation region for a fix connection of the charging socket.

In one embodiment, a plurality of locking members and buckles are provided, and the plurality of locking members and buckles are arranged at intervals along a circumferential inner wall of the mounting frame.

In one embodiment, the mounting frame is provided with a mounting portion for mounting the mounting bracket assembly to a preset position.

In one embodiment, the locking member is linearly movable between the pre-locking position and the final-locked position relative to the mounting frame.

In an embodiment, the locking member is linearly movable between the pre-locking position and the final-locked position along an installation direction perpendicular to the charging socket.

The present application also provides a charging socket assembly, which includes a charging socket and the above-mentioned mounting bracket assembly. The charging socket is detachably arranged in the installation region. A side wall of the charging socket is provided with a fixing structure suitable for the locking member, and the fixing structure is configured to be engaged with the locking member at the final-locked position to hold the charging socket on the mounting frame. The locking member is linearly movable between the pre-locking position and the final-locked position relative to the fixing structure.

In one embodiment, the locking member is linearly movable between the pre-locking position and the final-locked position along an axial direction perpendicular to the charging socket.

The mounting bracket assembly for fixing the charging socket provided by the present application has beneficial effects in that: compared with the existing technology, the mounting bracket assembly of the present application includes a mounting frame and a locking member. The mounting frame defines an installation region configured for receiving the charging socket and is provided with a connection structure configured for installing the locking element. The locking element and the connection structure can be movably arranged between a pre-locking position and a final-locked position. When the locking element and the connection structure are connected to each other at the pre-locking position, the charging socket is receivable within the installation region of the mounting frame, after the charging socket is received in the installation region, the locking member is moved from the pre-locking position to the final-locked position and the charging socket is detachably fixed in the installation region, such that the installation of the charging socket on the mounting bracket assembly is completed; when it is necessary to remove the charging socket from the mounting bracket assembly, the locking member is moved from the final-locked position to the pre-locking position to complete a removal of the charging socket from the mounting frame, which simplifies working procedures, and effectively improves working efficiency.

The charging socket assembly provided by the present application has beneficial effects in that: compared with the existing technology, the charging socket assembly of the present application includes a charging socket and the above-mentioned mounting bracket assembly, the charging socket is detachably arranged in the installation region. A side wall of the charging socket is provided with a fixing structure suitable for the locking member, which is configured to be engaged with the locking member at the final-locked position to hold the charging socket on the mounting frame. The locking member is linearly movable between the pre-locking position and the final-locked position relative to the fixing structure. When the locking element and the connection structure are connected to each other at the pre-locking position, the charging socket is receivable within the installation region of the mounting frame. After the charging socket is received in the installation region, the locking member is moved from the pre-locking position to the final-locked position, meanwhile, the locking member is fixedly connected to the fixing structure on the charging socket, and the charging socket is detachably fixed in the installation region, such that the installation of the charging socket on the mounting bracket assembly is completed; when it is necessary to remove the charging socket from the mounting bracket assembly, the locking member is moved from the final-locked position to the pre-locking position to complete the removal of the charging socket from the mounting frame, which simplifies working procedures, and effectively improves working efficiency.

BRIEF DESCRIPTION OF DRAWINGS

In order to illustrate the technical solutions in the embodiments of the present application more clearly, the following will briefly introduce the drawings needed in the description of the embodiments or the existing technology. Obviously, the drawings in the following description are merely some embodiments of the present application, for those of ordinary skill in the art can obtain other drawings on the basis of these drawings without creative labor.

Figure 1:
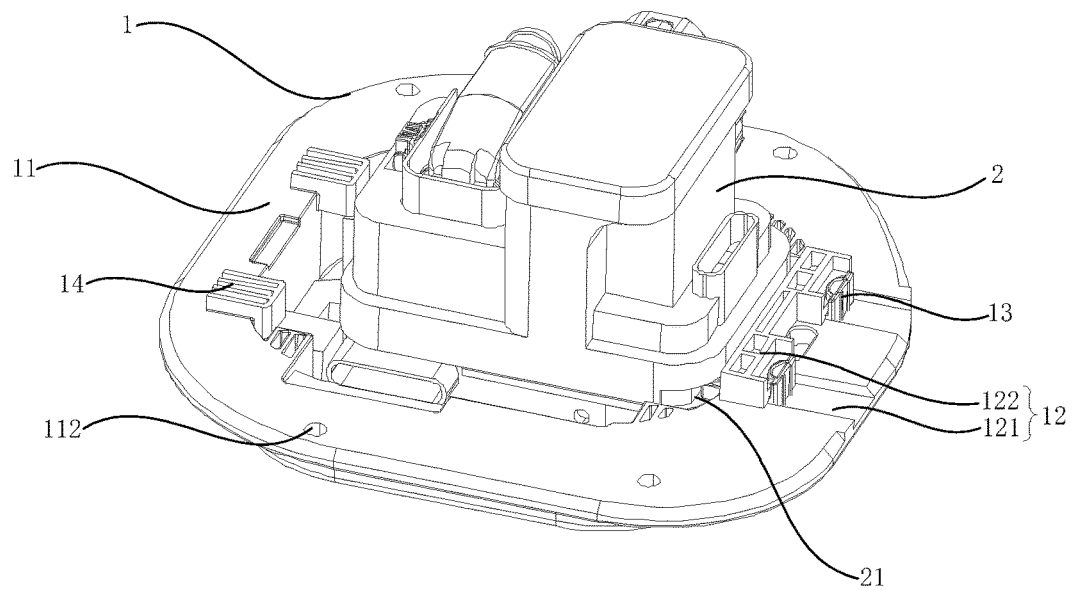
FIG. 1 is a three-dimensional schematic diagram of a charging socket assembly in accordance with an embodiment of the present application.

Among them, reference signs in the FIGS. are listed as follows:

1—mounting bracket assembly; 11—mounting frame; 111—installation region; 112—mounting portion; 12—connection structure; 121—limit guide groove; 122—limiting portion; 1221—limiting groove; 13—locking member; 131—plug-in body; 1311—final-locked boss; 1312—pre-locking boss; 1313—guide rail; 132—pressing portion; 1321—limiting protrusion; 1322—driver structure; 1323—skid-proof structure; 14—buckle; 2—charging socket; 21—fixing structure; 3—sealing ring.

DETAILED DESCRIPTION OF THE EMBODIMENTS

In order to make the technical problem to be solved, technical solutions and beneficial effects of the present application more comprehensible, the present application will be further described in detail below with reference to the accompanying drawings and specific embodiments. It should be understood that the specific embodiments described here are merely used to illustrate the present application and are not intended to limit the present application.

It should be noted that when an element is referred to as being "fixed to" or "disposed/provided on" another element, it may be directly or indirectly on the other element. When an element is referred to as being "connected to" another element, it may be directly or indirectly connected to the other element.

It should be understood that direction or position relationship indicated by terms of "length," "width," "upper," "lower," "front," "back," "left," "right," "vertical," "horizontal," "top," "bottom," "inner," "outer" and the like, are based on the orientation or position relationship shown in the drawings, which are merely used for the convenience of describing the present application and simplifying the description, rather than indicating or implying that the device or element referred to must have a specific orientation, be constructed and operated in a specific orientation, it thus cannot be understood as a limitation to the present application.

In addition, the terms "first" and "second" are only used for descriptive purpose and cannot be understood as indicating or implying relative importance or implicitly indicating the number of indicated technical features. Thus, the features defined with "first" and "second" may explicitly or implicitly include one or more of these features. In the description of the present application, the term of "a/the plurality of" means two or more, unless otherwise specifically defined.

Figure 2:
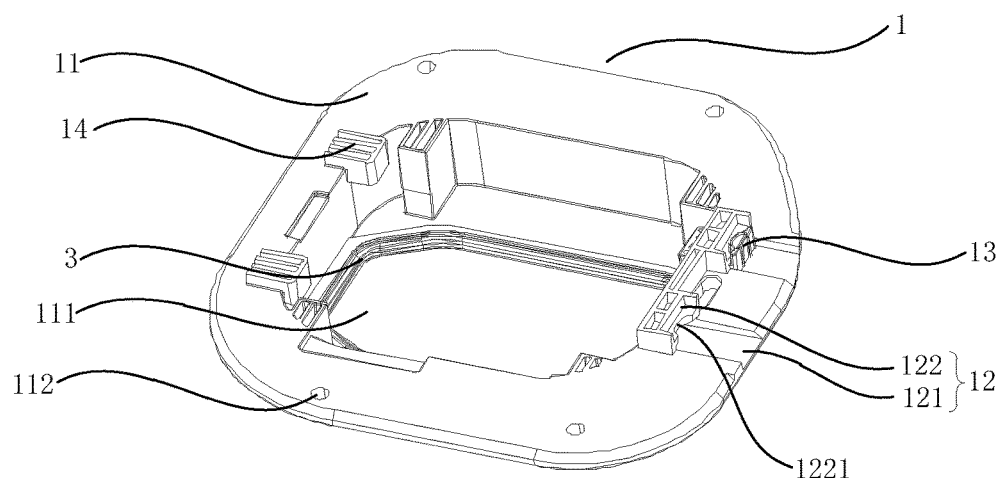
FIG. 2 is a three-dimensional schematic diagram of a mounting bracket assembly in accordance with an embodiment of the present application.

Referring to FIGS. 1 and 2, in an embodiment, it is provided a mounting bracket assembly 1 for fixing a charging socket 2. The mounting bracket assembly 1 includes a mounting frame 11 and a locking member 13. The mounting frame 11 defines an installation region 111 configured for receiving the charging socket 2, and a connection structure 12 is provided on the mounting frame 11 configured for installing the locking member 13. The locking member 13 and the connection structure 12 are movably arranged between a pre-locking position and a final-locked position. When the locking member 13 and the connection structure 12 are connected to each other at the pre-locking position, the charging socket 2 is receivable within the installation region 111 of the mounting frame 11. After the charging socket 2 is received in the installation region 111, the locking member 13 is moved from the pre-locking position to the final-locked position, and the charging socket 2 is detachably fixed in the installation region 111, such that the installation of the charging socket 2 on the mounting bracket assembly 1 is completed. When it is necessary to remove the charging socket 2 from the mounting bracket assembly 1, the locking member 13 is moved from the final-locked position to the pre-locking position to complete a removal of the charging socket 2 from the mounting frame 11, which simplifies the working procedure and effectively improves the working efficiency.

Referring again to FIGS. 1 and 2, as a specific implementation of the mounting bracket assembly 1 provided in this embodiment, the locking member 13 is linearly movable between the pre-locking position and the final-locked position relative to the mounting frame 11. After the charging socket 2 is received in the installation region 111, the locking member 13 is moved along a straight line from the pre-locking position to the final-locked position, and the charging socket 2 is detachably fixed in the installation region 111, such that the installation of the charging socket 2 on the mounting bracket assembly 1 is completed. When it is necessary to remove the charging socket 2 from the mounting bracket assembly 1, the locking member 13 is moved along a straight line from the final-locked position to the pre-locking position to complete the removal of the charging socket 2 from the mounting frame 11, which simplifies the working procedure and effectively improves the working efficiency. Optionally, the locking member 13 may be linearly movable between the pre-locking position and the final-locked position along an installation direction perpendicular to the charging socket 2. After the charging socket 2 is received in the installation region 111, the locking member 13 is moved from the pre-locking position to the final-locked position in the installation direction perpendicular to the charging socket 2, and the charging socket 2 is detachably fixed in the installation region 111, such that the installation of the charging socket 2 on the mounting bracket assembly 1 is completed. When it is necessary to remove the charging socket 2 from the mounting bracket assembly 1, the locking member 13 is moved from the final-locked position to the pre-locking position in the installation direction perpendicular to the charging socket 2 to complete the removal of the charging socket 2 from the mounting frame 11, which facilitates operations for the operator, and beneficially improves the working efficiency.

Also, referring to FIG. 1, in this embodiment, the connection mode of the mounting frame 11 and an installation position preset on a vehicle body is not limited here, and connection modes such as detachable connection or non-detachable connection may be used here. Optionally, the mounting frame 11 may be provided with a mounting portion 112 for mounting the mounting bracket assembly 1 to a preset position. The specific structure and quantity of the mounting portion 112 are not limited here. Optionally, the mounting portion 112 may be provided on the mounting frame 11. A plurality of mounting portions 112 may be provided, and the plurality of mounting portions 112 are arranged on the mounting frame 11 at intervals. The mounting frame 11 is fixedly connected to a preset position of the vehicle body in a screw connection, which is convenient for assembly and disassembly.

Also, referring to FIG. 2, in this embodiment, the mounting frame 11 of the mounting bracket assembly 1 is located on a side wall of the installation region 111, the mounting frame 11 is also provided with buckles 14 for a fix connection of the charging socket 2. By providing the buckles 14 to assist the fixed connection, it can not only improve a stability of the connection between the charging socket 2 and the mounting frame 11, but also simplifies the working process and improves the working efficiency more effectively. The number of the locking member 13 and the buckle 14 is not limited here. Optionally, a plurality of locking members 13 and buckles 14 may be provided, and the plurality of locking members 13 and buckles 14 are arranged at intervals along a circumferential inner wall of the mounting frame 11 to ensure the stability of the connection between the charging socket 2 and the mounting frame 11 and to improve the reliability of the mounting bracket assembly 1.

Figure 3:
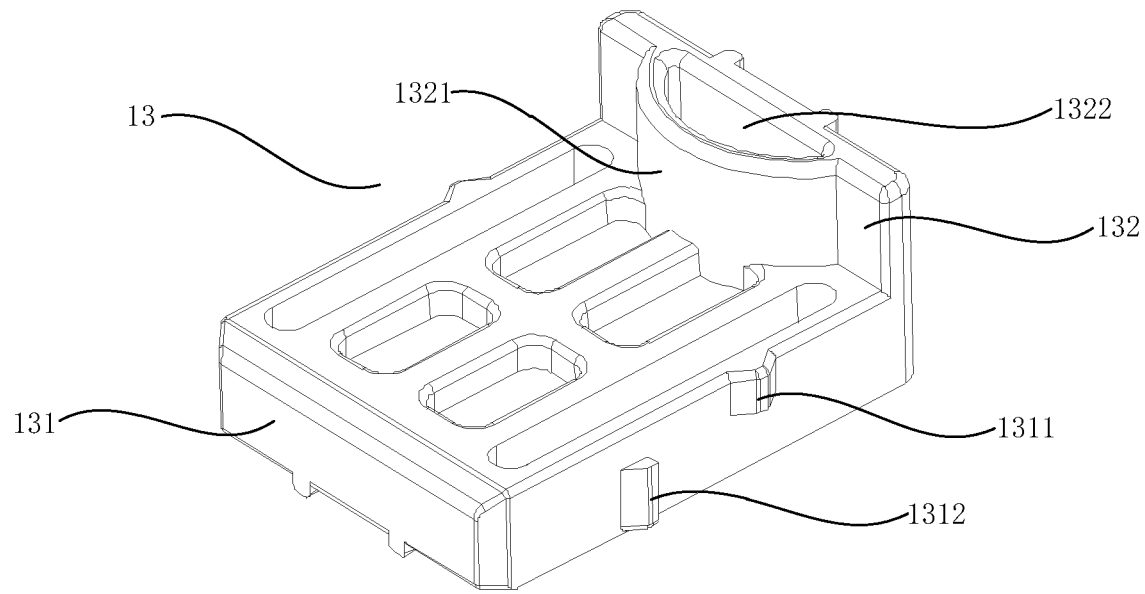
FIG. 3 is a first three-dimensional schematic diagram of a locking member of the mounting bracket assembly in accordance with an embodiment of the present application.
Figure 4:
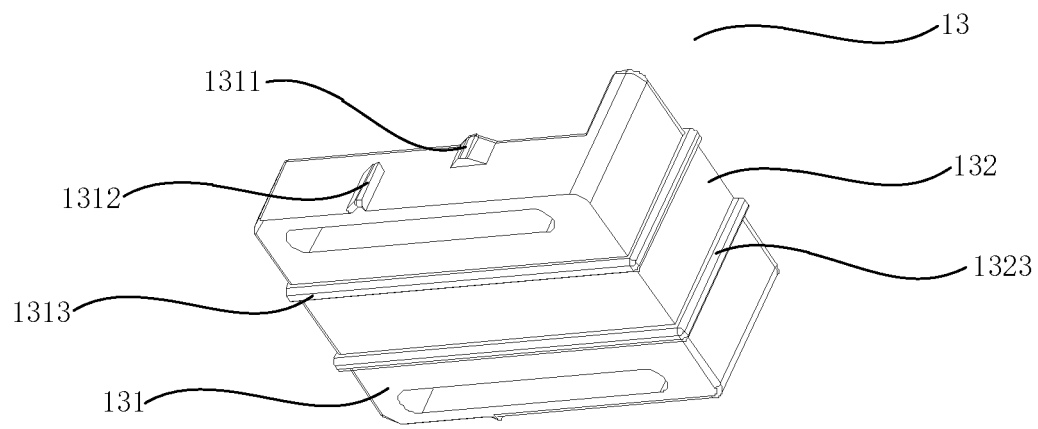
FIG. 4 is a second three-dimensional schematic diagram of the locking member of the mounting bracket assembly in accordance with an embodiment of the present application.

Referring to FIGS. 2 to 4, in this embodiment, the connection structure 12 of the mounting bracket assembly 1 includes a limit guide groove 121 and a limiting portion 122 arranged above the limit guide groove 121. The limit guide groove 121 is defined in a surface of the mounting frame 11 and configured to limit a moving direction of the locking member 13. An installation space is formed by enclosing the limit guide groove 121 and the limiting portion 122, and the installation space is configured for receiving the locking member 13. The pre-locking position and the final-locked position are both arranged in the installation space. The locking member 13 is firmly installed in the installation space and can be movably arranged between the pre-locking position and the final-locked position. The specific structure of the locking member 13 is not limited here. The locking member 13 includes a plug-in body 131, and two opposite side walls of the plug-in body 131 are respectively convex to form a final-locked boss 1311 for restricting the movement of the locking member 13 relative to the mounting frame 11 at the final-locked position, and a pre-locking boss 1312 for restricting the movement of the locking member 13 at the pre-locking position relative to the mounting frame 11 at the pre-locking position. The final-locked boss 1311 and the pre-locking boss 1312 are arranged at an interval. The final-locked boss 1311 and the pre-locking boss 1312 both play a role in preventing the locking member 13 from sliding out of the installation space. Optionally, two opposite side walls of the limit guide groove 121 are respectively provided with a fitting protrusion arranged between the final-locked boss 1311 and the pre-locking boss 1312. The fitting protrusion is configured to limit a displacement of the locking member 13. When the fitting protrusion is located between the final-locked boss 1311 and the pre-locking boss 1312, the locking member 13 is at the pre-locking position, the charging socket 2 may be placed on the mounting frame 11 in the installation region 111. When the charging socket 2 is received in the installation region 111, the locking member 13 is moved from the pre-locking position to the final-locked position, the fitting protrusion now is away from the pre-locking boss 1312 and snap-fitted with the final-locked boss 1311, the charging socket 2 is detachably fixed in the installation region 111, such that the installation of the charging socket 2 on the mounting bracket assembly 1 is completed. Optionally, a bottom surface of the limit guide groove 121 may be concavely formed with a guide slot for restricting the moving direction of the locking member 13, and a bottom surface of the plug-in body 131 is convexly formed with a guide rail 1313 suitable for the guide slot. The guide rail 1313 at the bottom of the member 13 is received in the guide groove in the limit guide groove 121, which is beneficial to restrict the moving direction of the locking member 13 sliding between the pre-locking position and the final-locked position, meanwhile, it improves an accuracy of the assembly of the mounting bracket assembly 1.

Referring again to FIGS. 2 to 4, in this embodiment, the locking member 13 of the mounting bracket assembly 1 also includes a pressing portion 132. A side wall of the pressing portion 132 extends to form a limiting protrusion 1321. The side wall of the limiting portion 122 has a surface being recessed to form a limiting groove 1221 such that the limiting protrusion 1321 can be placed. The limiting protrusion 1321 provided on the pressing portion 132 is matched with the limiting groove 1221 on the limiting portion 122, which further ensures the accuracy of the assembly of the mounting bracket assembly 1 and the accuracy of the moving direction of the locking member 13, thus enables the locking member 13 to accurately move from the pre-locking position to the final-locked position. Optionally, a driver structure 1322 may be provided on a top surface of the pressing portion 132 to facilitate the operator to drive the locking member 13 to move between the pre-locking position and the final-locked position. The specific structure of the driver structure 1322 is not limited here. Optionally, the driver structure 1322 may be a driving groove recessed on the top surface of the pressing portion 132, the structure thus is simple, so that it saves effort for the operator to drive the locking member 13 to move, thereby it is beneficial to reduce the difficulty of the work and improve the work efficiency. Optionally, the surface of the pressing portion 132 may be provided with a skid-proof structure 1323, which is beneficial to increase a friction between the pressing portion 132 and the operator's hand, so that the operation is more labor-saving, and it is convenient for the operator to drive the locking member 13 to move between the lock position and the final-locked position and is beneficial to reduce the difficulty of operation and improves the work efficiency. The specific structure of the skid-proof structure 1323 is not limited here. Optionally, the skid-proof structure 1323 may be a skid-proof protrusion disposed on the surface of the pressing portion 132.

Referring back to FIG. 1, the present application also provides a charging socket assembly, including a charging socket 2 and the mounting bracket assembly 1 as above-mentioned. The charging socket 2 is detachably arranged in the installation region 111. A side wall of the charging socket 2 is provided with a fixing structure 21 that matches the locking member 13 and configured to cooperate with the locking member 13 at the final-locked position and to hold the charging socket 2 on the mounting frame 11. The locking member 13 is linearly movable between the pre-locking position and the final-locked relative to the fixing structure 21. When the locking member 13 and the connection structure 12 are connected to each other at the pre-locking position, the charging socket 2 is placed on the mounting frame 11 in the installation region 111. After the charging socket 2 is received in the installation region 111, the locking member 13 is moved from the pre-locking position to the final-locked position, meanwhile, the locking member 13 is fixedly connected to the fixing structure 21 on the charging socket 2, and the charging socket 2 is detachably fixed in the installation region 111, such that the installation of the charging socket 2 on the mounting bracket assembly 1 is completed. When it is necessary to remove the charging socket 2 from the mounting bracket assembly 1, the locking member 13 is moved from the final-locked position to the pre-locking position to complete the removal of the charging socket 2 from the mounting frame 11, which simplifies the working procedure and effectively improves the working efficiency. The specific structure of the fixing structure 21 of the charging socket 2 is not limited here. Optionally, the fixing structure 21 may be a fixing slot formed as a recess on the side wall of the charging socket 2 configured for receiving the locking member 13. Optionally, the locking member 13 may be linearly movable between the pre-locking position and the final-locked position along an axial direction perpendicular to the charging socket 2. After the charging socket 2 is received in the installation region 111, the locking member 13 is moved from the pre-locking position to the final-locked position in the axial direction perpendicular to the charging socket 2, and the charging socket 2 is detachably fixed in the installation region 111, such that the installation of the charging socket 2 on the mounting bracket assembly 1 is completed. When it is necessary to remove the charging socket 2 from the mounting bracket assembly 1, the locking member 13 is moved from the final-locked position to the pre-locking position in the axial direction perpendicular to the charging socket 2 to complete the removal of the charging socket 2 from the mounting frame 11, which facilitates operations for the operator, and beneficially improves the working efficiency.

Optionally, the charging socket assembly may also include a sealing ring 3 arranged between the mounting bracket assembly 1 and the charging socket 2 to seal the gap between the mounting bracket assembly 1 and the charging socket 2. On the one hand, the frictional force between the mounting bracket assembly 1 and the charging socket 2 can be enlarged, which is beneficial to improve the stability of the connection between the two, on the other hand, it can effectively improve a sealing and waterproof performance of the charging socket assembly, play a certain protective effect on its internal components, and help extend a service life of the charging socket assembly.

The above embodiments are merely some preferred embodiments of the present application and are not intended to limit the present application. Any modification, equivalent replacement and improvement made within the spirit and principle of the present application shall be included within the protection scope of the present application.

What is claimed is:

1. A mounting bracket assembly for fixing a charging socket, the mounting bracket assembly comprising a mounting frame and a locking member; the mounting frame defining an installation region for receiving the charging socket, the mounting frame being provided with a connection structure for installing the locking member;
   a limit guide groove, defined in a surface of the mounting frame and configured to limit a moving direction of the locking member;
   a limiting portion, arranged above the limit guide groove;
   wherein the locking member and the connection structure are movably connected to each other between a pre-locking position and a final-locked position;
   wherein, when the locking member and the connection structure are connected to each other at the pre-locking position, the charging socket is receivable within the installation region of the mounting frame;
   wherein after the charging socket is received in the installation region, the locking member is moved from the pre-locking position to the final-locked position, and the charging socket is detachably fixed in the installation region; and wherein an installation space is formed by enclosing the limit guide groove and the limiting portion, and the installation space is configured for receiving the locking member.

2. The mounting bracket assembly according to claim 1, wherein the locking member comprises a plug-in body, and each of two opposite side walls of the plug-in body is convex to form a pre-locking boss and a final-locked boss;

wherein the pre-locking boss is configured to restrict a movement of the locking member relative to the mounting frame at the pre-locking position;

wherein the final-locked boss is configured to restrict the movement of the locking member relative to the mounting frame at the final-locked position; and wherein the final-locked boss and the pre-locking boss are arranged at an interval.

3. The mounting bracket assembly according to claim 2, wherein each of two opposite side walls of the limit guide groove is provided with a fitting protrusion arranged between the final-locked boss and the pre-locking boss, wherein the fitting protrusion is configured to limit a displacement of the locking member.

4. The mounting bracket assembly according to claim 2, wherein a bottom surface of the limit guide groove is concavely formed with a guide slot for restricting a moving direction of the locking member, and a bottom surface of the plug-in body is convexly formed with a guide rail suitable for the guide slot.

5. The mounting bracket assembly according to claim 1, wherein the locking member further comprises a pressing portion, a side wall of the pressing portion extends to form a limiting protrusion, and a side wall surface of the limiting portion is concavely formed with a limiting groove configured for receiving the limiting protrusion.

6. The mounting bracket assembly according to claim 5, wherein a top surface of the pressing portion is provided with a driver structure, and the driver structure is a driving groove recessed on the top surface of the pressing portion.

7. The mounting bracket assembly according to claim 5, wherein a surface of the pressing portion is provided with a skid-proof structure, and the skid-proof structure is a skid-proof protrusion protruding from the surface of the pressing portion.

8. A mounting bracket assembly for fixing a charging socket, the mounting bracket assembly comprising a mounting frame and a locking member; the mounting frame defining an installation region for receiving the charging socket, the mounting frame being provided with a connection structure for installing the locking member;

wherein the mounting frame is further provided with a buckle arranged on a side wall of the installation region for a fix connection of the charging socket;

wherein the locking member and the connection structure are movably connected to each other between a pre-locking position and a final-locked position;

wherein, when the locking member and the connection structure are connected to each other at the pre-locking position, the charging socket is receivable within the installation region of the mounting frame; and wherein after the charging socket is received in the installation region, the locking member is moved from the pre-locking position to the final-locked position, and the charging socket is detachably fixed in the installation region.

9. The mounting bracket assembly according to claim 8, wherein a plurality of locking members and buckles are provided, and the plurality of locking members and buckles are arranged at intervals along a circumferential inner wall of the mounting frame.

10. The mounting bracket assembly according to claim 1, wherein the mounting frame is provided with a mounting portion for mounting the mounting bracket assembly to a preset position.

11. The mounting bracket assembly according to claim 1, wherein the locking member is linearly movable between the pre-locking position and the final-locked position relative to the mounting frame.

12. The mounting bracket assembly according to claim 1, wherein the locking member is linearly movable between the pre-locking position and the final-locked position along an installation direction perpendicular to the charging socket.

13. A charging socket assembly, comprising a charging socket and a mounting bracket assembly for fixing the charging socket, wherein the mounting bracket assembly comprises a mounting frame and a locking member; the mounting frame defining an installation region for receiving the charging socket, the mounting frame being provided with a connection structure for installing the locking member;

wherein the locking member and the connection structure are movably connected to each other between a pre-locking position and a final-locked position;

wherein, when the locking member and the connection structure are connected to each other at the pre-locking position, the charging socket is receivable within the installation region of the mounting frame;

wherein after the charging socket is received in the installation region, the locking member is moved from the pre-locking position to the final-locked position, and the charging socket is detachably fixed in the installation region;

wherein the charging socket is detachably arranged in the installation region; and wherein a side wall of the charging socket is provided with a fixing structure suitable for the locking member, and the fixing structure is configured to be engaged with the locking member at the final-locked position to hold the charging socket on the mounting frame; and wherein the locking member is linearly movable between the pre-locking position and the final-locked position relative to the fixing structure.

14. The charging socket assembly according to claim 13, wherein the locking member is linearly movable between the pre-locking position and the final-locked position along an axial direction perpendicular to the charging socket.

* * * * *